United States Patent
Poplawski et al.

(12)
(10) Patent No.: US 6,837,142 B1
(45) Date of Patent: Jan. 4, 2005

(54) CLAMPING CRUISE CONTROL SYSTEM

(75) Inventors: Herb Poplawski, Racine, WI (US); Thomas D. Wiley, Lovington, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 152 days.

(21) Appl. No.: 10/295,339

(22) Filed: Nov. 14, 2002

(51) Int. Cl.[7] .............................................. F15B 15/24
(52) U.S. Cl. .................................... 92/13.7; 92/12.2
(58) Field of Search ............................... 92/12.2, 12.1, 92/13.7, 15, 18

(56) References Cited

U.S. PATENT DOCUMENTS

| | | | |
|---|---|---|---|
| 3,732,785 A | * | 5/1973 | Boydell ........................ 91/506 |
| 4,281,737 A | | 8/1981 | Molzahn |
| 4,553,626 A | | 11/1985 | Kazmierczak et al. |
| 4,620,575 A | | 11/1986 | Cuba et al. |
| 4,727,710 A | | 3/1988 | Kuhn |
| 5,201,692 A | | 4/1993 | Johnson et al. |
| 5,228,360 A | | 7/1993 | Johnson |
| 5,314,387 A | | 5/1994 | Hauser et al. |
| 5,791,230 A | * | 8/1998 | Goellner ........................ 92/18 |
| 6,122,996 A | | 9/2000 | Hauser et al. |
| 6,202,779 B1 | | 3/2001 | Musat |
| 6,233,931 B1 | * | 5/2001 | Matsufuji ..................... 92/12.2 |
| 6,253,637 B1 | | 7/2001 | Hauser et al. |
| 6,314,730 B1 | * | 11/2001 | Shimizu ...................... 92/12.2 |
| 6,322,474 B1 | | 11/2001 | Hauser |

* cited by examiner

*Primary Examiner*—Thomas E. Lazo
(74) *Attorney, Agent, or Firm*—Neal, Gerber & Eisenberg, LLP (57) ABSTRACT

A cruise control assembly for use in connection with a hydraulic pump and a control arm linked to a swash plate that is moveable to provide the swash plate with a plurality of non-discrete angular orientations to affect fluid displacement of the hydraulic pump. The cruise control assembly generally includes a rod connected to and moveable with the control arm and a clamp for selectively engaging the rod to inhibit movement of the control arm so as to maintain the swash plate in one of the plurality of non-discrete angular orientations.

46 Claims, 7 Drawing Sheets

CLAMPING CRUISE CONTROL SYSTEM

BACKGROUND OF THE INVENTION

This invention relates generally to hydrostatic transmissions and, more particularly, to a cruise control system for use in connection with a hydrostatic transmission.

Hydrostatic transmissions ("HSTs"), including integrated hydrostatic transmissions ("IHTs"), are well known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the angular orientation of the swash plate affects the degree of axial movement of the pump pistons. The movement of the pump pistons forces a hydraulic fluid through the porting to the motor pistons which causes the motor pistons to be forced against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor to drive one or more axles of a riding lawn mower, small tractor, or the like.

For maintaining a desired hydrostatically driven vehicle speed, various speed control systems are known in the art. By way of example, speed control systems are disclosed in U.S. Pat. Nos. 4,620,575, 4,553,626,4,281,737, 4,727,710, 5,228,360, and 6,202,779. While such known speed control mechanisms do work for their intended purpose, they do suffer disadvantages related to their size, cost, and complexity. Accordingly, it is an object of the present invention to provide an improved cruise control system.

SUMMARY OF THE INVENTION

In accordance with this object, a cruise control assembly is provided for use in connection with a hydraulic pump and a control arm linked to a swash plate that is moveable to provide the swash plate with a plurality of non-discrete angular orientations to affect fluid displacement of the hydraulic pump. The cruise control assembly generally includes a rod connected to and moveable with the control arm and a clamp for selectively engaging the rod to inhibit movement of the control arm so as to maintain the swash plate in one of the plurality of non-discrete angular orientations.

A better understanding of this and other objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
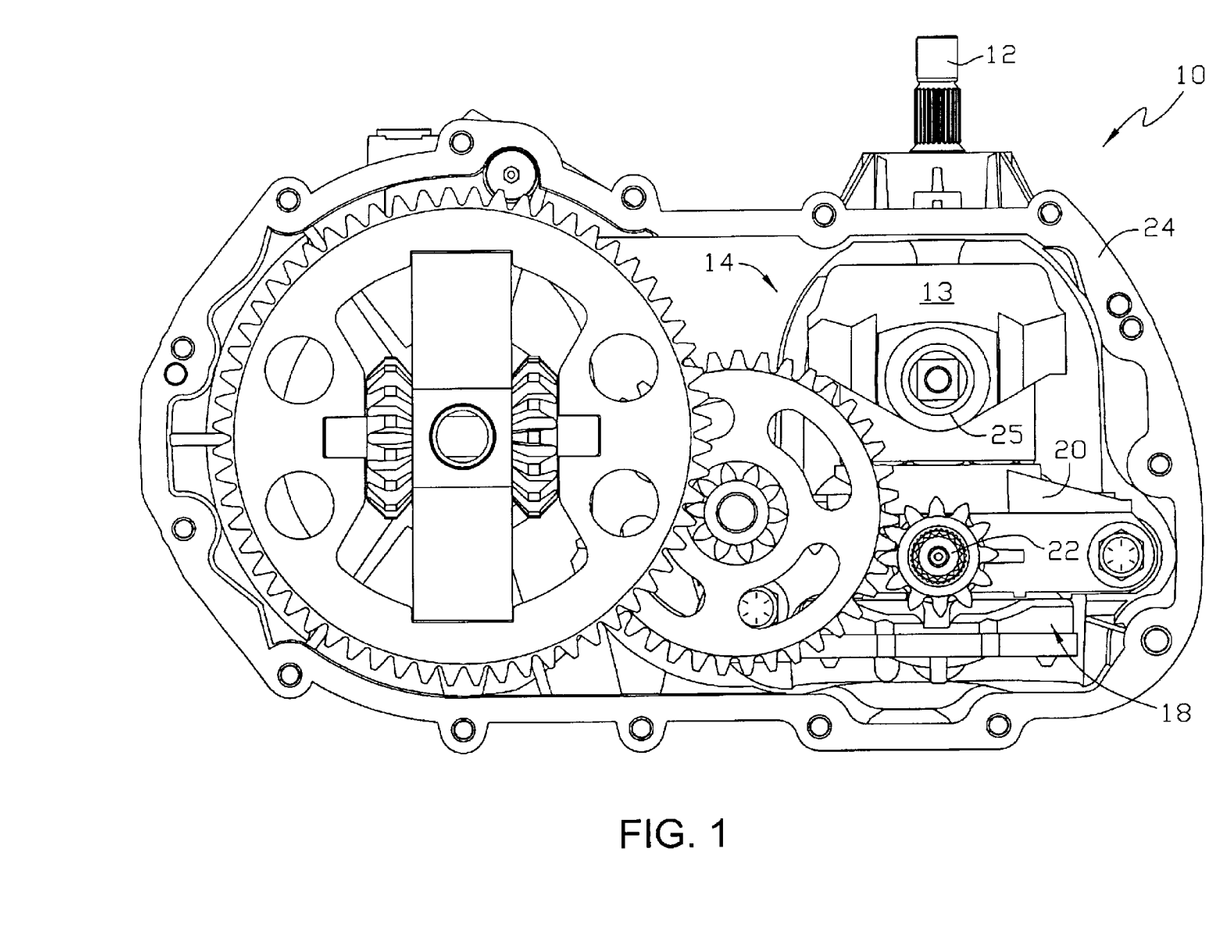
FIG. 1 illustrates an internal view of an exemplary embodiment of a hydrostatic transmission.

Turning now to the figures, wherein like reference numerals refer to like elements, there is illustrated in FIG. 1 an exemplary hydrostatic transmission in the form of an IHT 10. As will be understood by those of skill in the art, the IHT 10 generally operates on the principle of an input shaft 12 rotatably driving a hydraulic pump 14 which, through the action of its pump pistons, pushes hydraulic fluid to a hydraulic motor 18 through porting formed in a center section 20 to cause the rotation of the hydraulic motor (not shown). The rotation of the hydraulic motor causes the rotation of a motor shaft 22 which rotation is eventually transferred through a gearing system or the like to drive one axle shaft (in the case of a zero-turn hydrostatic transaxle) or a pair of axle shafts 26 (as would be used in the vehicle illustrated in FIG. 8). A motive force from, for example, an engine may be supplied directly to the input shaft 12 or indirectly by means of a pulley to drive the hydraulic pump 14. For a more detailed description of the principles of operation of such a hydrostatic transmission, the reader is referred to U.S. Pat. Nos. 5,201,692, 6,322,474 and 6,122,996 which are incorporated herein by reference in their entirety.

To support the components of the IHT 10, the IHT 10 is provided with a housing or casing 24. In the illustrated example, the housing comprises a first side housing section and a second side housing section that are joined along a substantially vertical junction surface. Extending from the top of the housing 24 is the input shaft 12. Meanwhile, the axle shafts 26 in the illustrated example would extend from both the first side housing section and the second side housing section. Thus, in the illustrated, exemplary IHT 10, the axis of the axle shafts 26 would be generally perpendicular to the substantially vertical junction surface. Similarly, in the illustrated embodiment, since the center section 20 is generally "L-shaped," the plane of the pump running surface of the center section 20 is generally perpendicular to the substantially vertical junction surface while the plane of the motor running surface of the center section 20 is generally parallel to the substantially vertical junction surface. The axis of the motor shaft 22 would be generally parallel to the axis of the axle shafts 26 and perpendicular to the axis of the input shaft 12. It is to be understood, however, that this arrangement is merely illustrative and that the housing and/or IHT operating components can be otherwise arranged without departing from the scope of this invention.

For placing the hydraulic pump 14 in fluid communication with the hydraulic motor, the center section 20 includes hydraulic porting. The hydraulic porting is in further fluid communication with a source of makeup fluid, such as a fluid sump or a charge gallery. Generally, the hydraulic porting comprises a high pressure side through which fluid moves from the hydraulic pump 14 to the hydraulic motor and a low pressure side through which fluid returns from the hydraulic motor to the hydraulic pump 14. A filter assembly 18 may be positioned adjacent the center section 20, intermediate the sump and the hydraulic porting, to minimize the introduction of impurities, such as metal shavings, into the hydraulic circuit when makeup fluid is drawn into the hydraulic circuit.

To adjust the amount of oil that is forced from the hydraulic pump 14 to the hydraulic motor via the high pressure side hydraulic porting, the IHT 10 includes a moveable swash plate 13 against which the pump pistons travel. The direction of rotation of the hydraulic pump 14 is fixed by the rotation of the input shaft 12 and, as such, the hydraulic pump 14 is nearly always rotated in one direction. As will be understood by those of ordinary skill in the art, the swash plate 13 may be moved to a variety of positions to vary the stroke of the pump pistons and the direction of rotation of the hydraulic motor. Generally, as the angular orientation of the swash plate 13 is varied in one direction from the neutral position the axial displacement or stroke of the pump pistons is varied, which then drives the hydraulic motor in a direction determined by the hydraulic porting at a speed that is related to the volume of the fluid displaced by the pump pistons taking into consideration the efficiency of the system. In the neutral position, the swash plate 13 does not function to axially displace the pump pistons.

Rotation of the hydraulic motor results from the motor pistons moving against a thrust bearing under the influence of the hydraulic fluid. As the angular orientation of the swash plate 13 is decreased to pass through the neutral position, the direction of rotation of the hydraulic motor is reversed and the speed of the hydraulic motor is again influenced by the volume of fluid displaced by the pump pistons. Since the speed of rotation of the hydraulic motor is dependent upon the amount of hydraulic fluid pumped thereinto by the hydraulic pump 14 and the direction of rotation of the hydraulic motor is dependent upon the angular orientation of the swash plate 13, the angular orientation of the swash plate 13 is seen to control the speed and direction of rotation of the hydraulic motor and, as will be apparent, the speed and direction of rotation of the axle shaft(s) 26.

Figure 8:
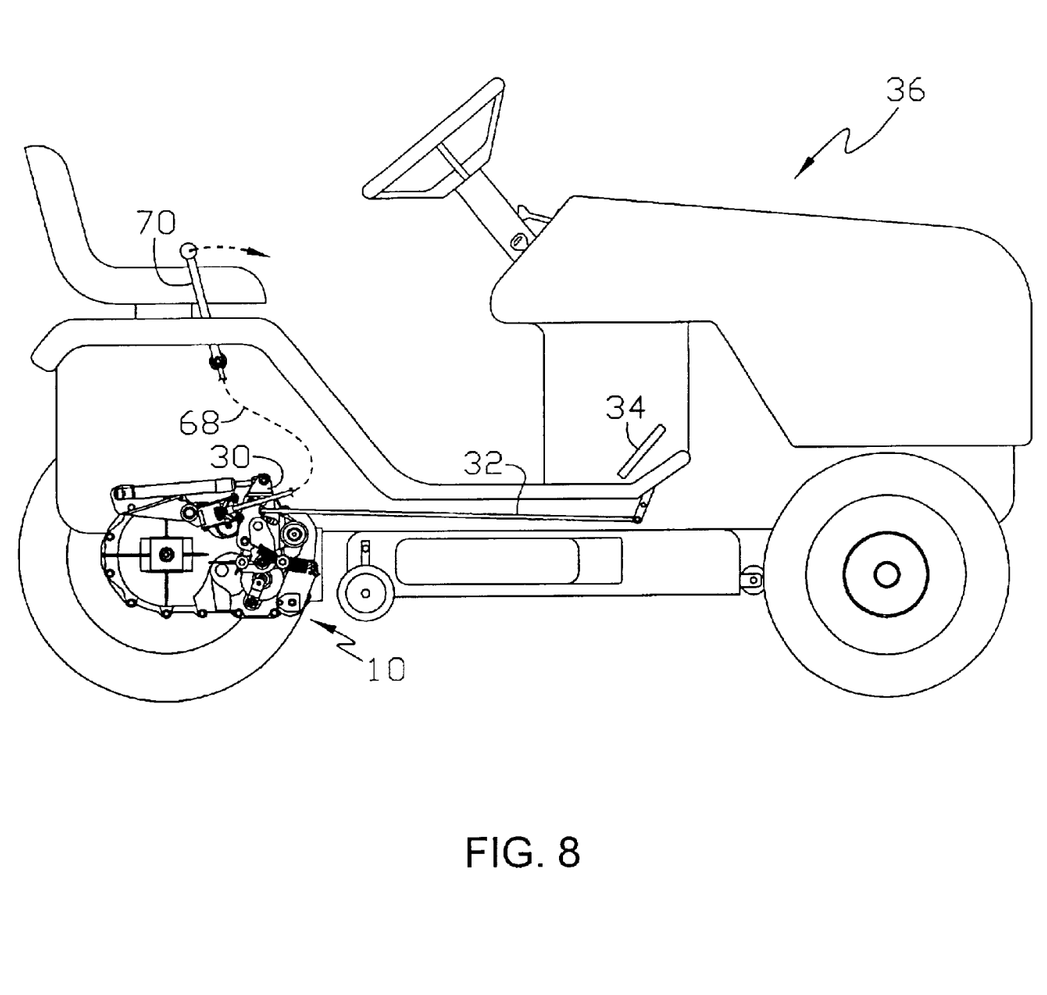
FIG. 8 illustrates the hydrostatic transmission and cruise control system of FIG. 2 installed on an exemplary vehicle.

For changing the angular orientation of the swash plate 13, the swash plate 13 has a trunnion arm 25 that is rotatably supported in the housing 24 of the IHT 10. Rotation of the trunnion arm 25 changes the angular orientation of the swash plate 13 with respect to the pump pistons. To rotate the trunnion arm 25 and, accordingly, move the swash plate 13, a control arm 30 is coupled to the trunnion arm. As illustrated in FIG. 8, the control arm 30 may be connected, via a driving link 32 or the like, to a lever, pedal, etc. (collectively referred to as a pedal 34) provided on a vehicle 36 whereby movement of the pedal 34 is translated to the control arm 30 to cause the rotation of the trunnion arm 25 and movement of the swash plate 13.

To return the HST 10 from a driving position (i.e., one in which the swash plate 13 has an angular orientation that causes axial displacement of the pump pistons) to the neutral position, a return to neutral ("RTN") mechanism 38 may be mounted to the housing 24 that cooperatively engages the control arm 30. Generally, as illustrated in FIGS. 2–5, an exemplary RTN mechanism 38 comprises a return arm 40 that is rotationally mounted to the housing 24. The return arm 40 further comprises a generally arcuate surface that engages, for example, a bearing assembly 42 that is mounted on or otherwise formed as part of the control arm 30. A spring 43 serves to bias the return arm 40 against the bearing assembly 42.

Figure 2:
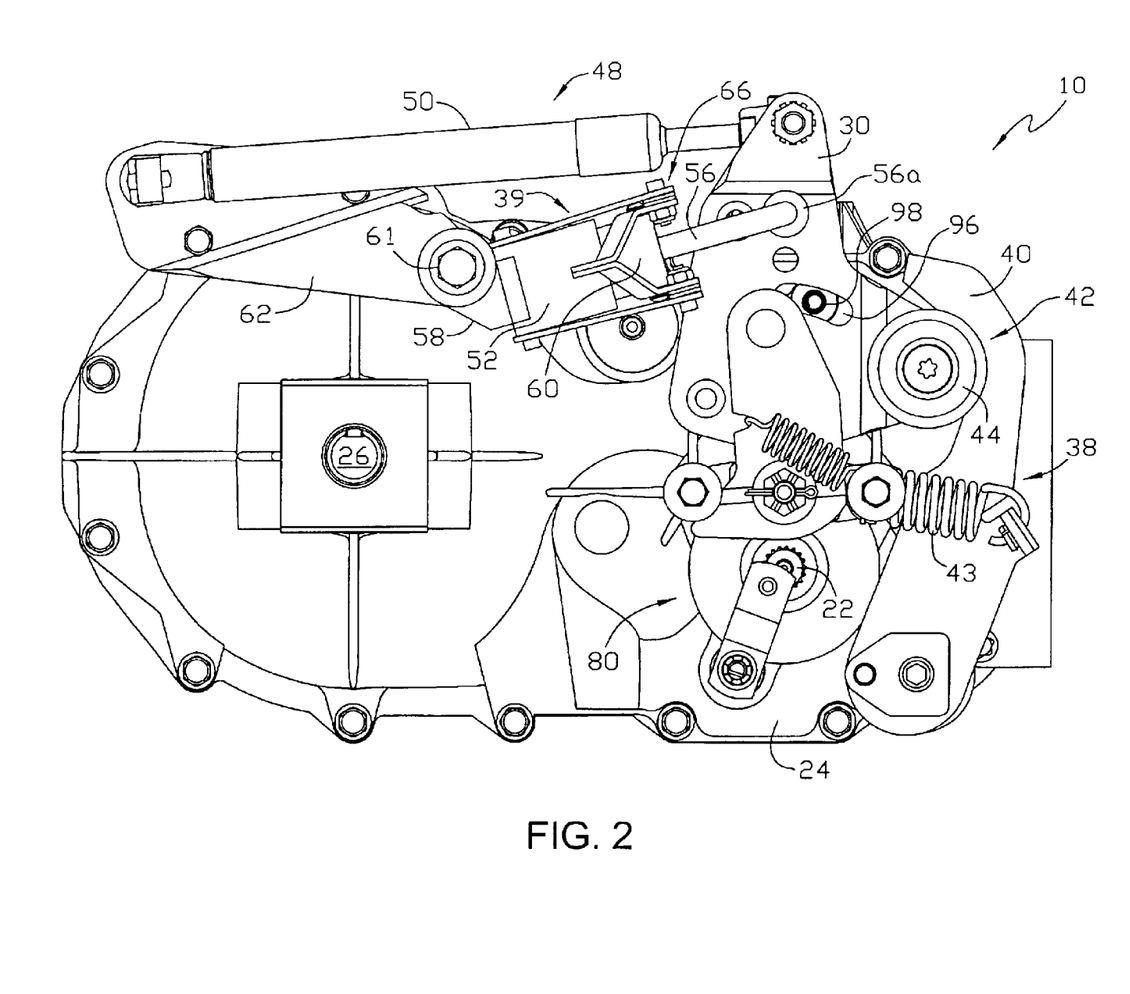
FIG. 2 illustrates an exemplary cruise control system installed on the hydrostatic transmission of FIG. 1 in which the cruise control system is in a deactivated position with the hydrostatic transmission in a neutral position.
Figure 3:
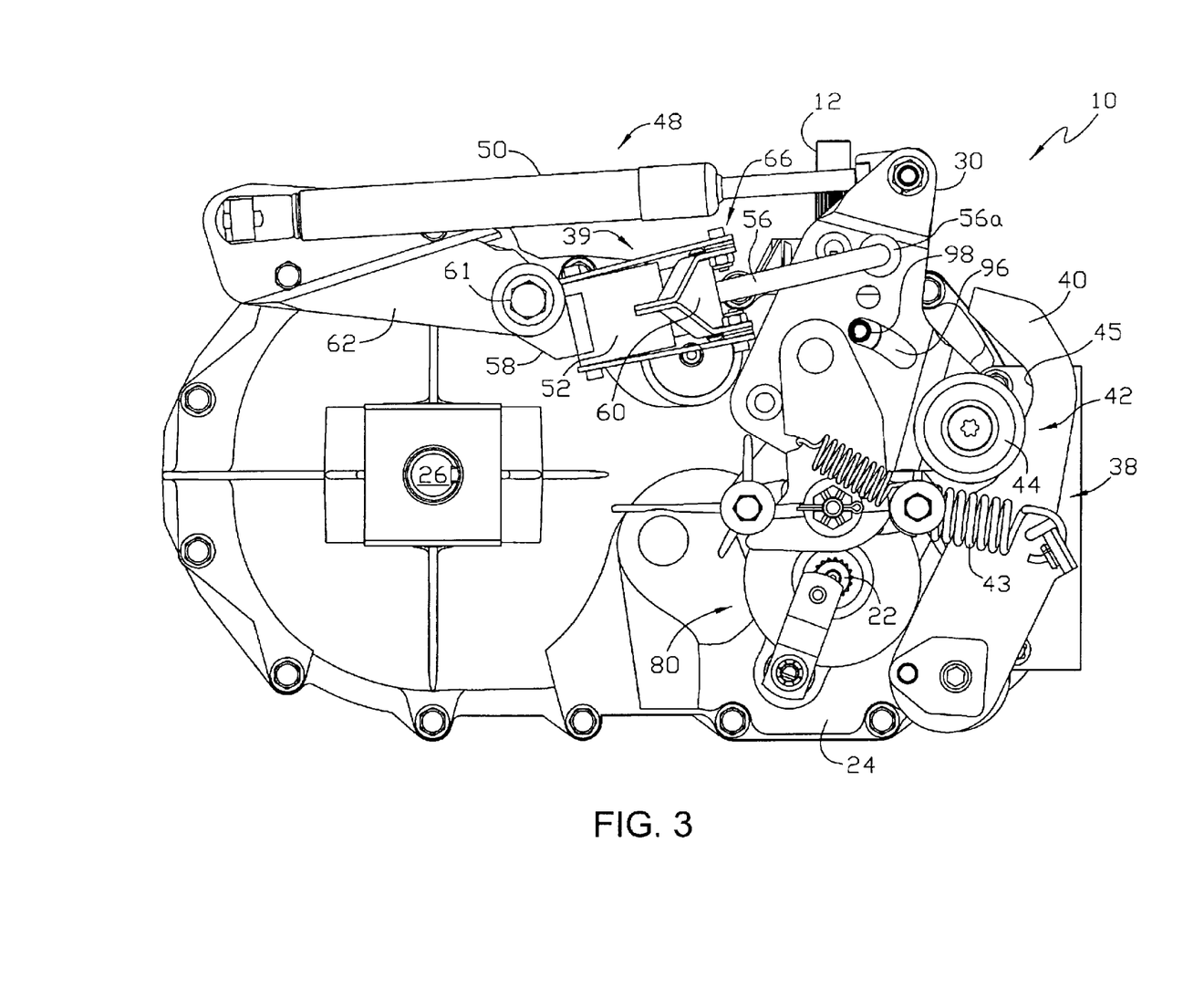
FIG. 3 illustrates the cruise control system of FIG. 2 in a deactivated position with the hydrostatic transmission in a forward driving position.

In operation, when the control arm 30 is moved from the neutral position, illustrated in FIG. 2, to a driving position, illustrated as the forward driving position in FIG. 3, the control arm bearing assembly 42 moves against the arcuate surface of the return arm 40 which causes the return arm 40 to rotate against the bias of the spring 43. When the control arm 30 is released, for example when the pedal 34 is released, the biasing force of the spring 43 causes the return arm 40 to rotate such that the movement of the return arm 40 causes the arcuate surface of the return arm 40 to force the control arm bearing assembly 42 along the arcuate surface. The return arm 40 continues to move in this manner until further movement of the return arm 40 is inhibited, i.e., the control arm bearing assembly 42 becomes positioned in a well or bottom 45 of the arcuate surface of the return arm 40. When the control arm 30 stops moving under the influence of the biased return arm 40, the control arm 30 will have been moved to a position that places the swash plate 13 in the neutral position. It will be appreciated that the arcuate nature of the engaging surface of the return arm 40 allows the RTN mechanism 38 to function when the control arm 30 is moved into either the forward and reverse driving directions.

For maintaining engagement between the return arm 40 with bearing assembly 42, a cap 44 may be affixed to bearing assembly 42 that functions in conjunction with control arm 30 to laterally constrain the return arm 40 on bearing assembly 42. To dampen movement of the control arm 30 as it is being returned to the neutral position under the influence of the RTN mechanism 38, the control arm 30 may be attached to a dampening mechanism 48. In the illustrated example, the dampening mechanism 48 comprises a two-way piston 50 attached at one end to the housing 24, for example via a bracket 62, and at the other end to the control arm 30. The two-way action of the piston 50 allows movement of the control arm 30 to be dampened when being returned to the neutral position from either forward or reverse driving positions. Alternatively, the dampening mechanism 48 may be linked to the RTN mechanism 38.

For use in maintaining a relative position of the control arm 30 and, accordingly, an angular orientation of the swash plate 13, to thereby generally maintain a desired hydrostatically driven vehicle speed when the control arm 30 is released (e.g., the pedal 34 is released), a cruise control mechanism 39 may be mounted to the housing 24 that is adapted to cooperatively engage the control arm 30. As will be described in greater detail, and as illustrated in FIGS. 2–6, the cruise control mechanism 39 comprises a housing 52 that carries a clamp 54 which is used to frictionally engage a rod 56 that is attached to the control arm 30 for the purpose of maintaining the control arm 30 in a desired position. To mount the housing 52 to the casing 24, the housing 52 may be provided with an extension 58 having an opening for accepting a bolt 61 used to rotationally attach the housing 52 to the casing 24, to a bracket 62 attached to the casing 24, or the like.

Figure 5:
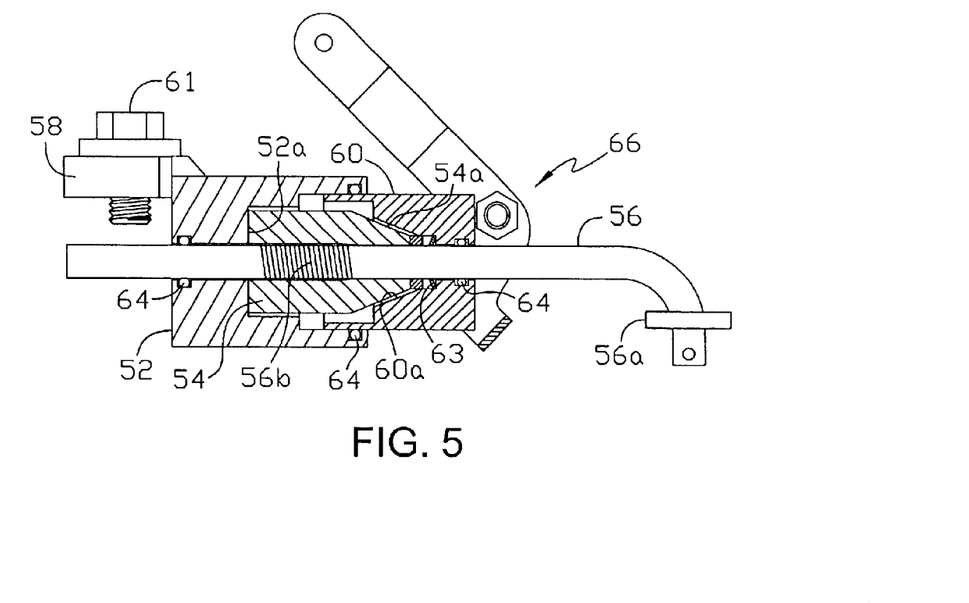
FIG. 5 illustrates a cross-sectional view of the cruise control system of FIG. 2 in the deactivated position.
Figure 6:
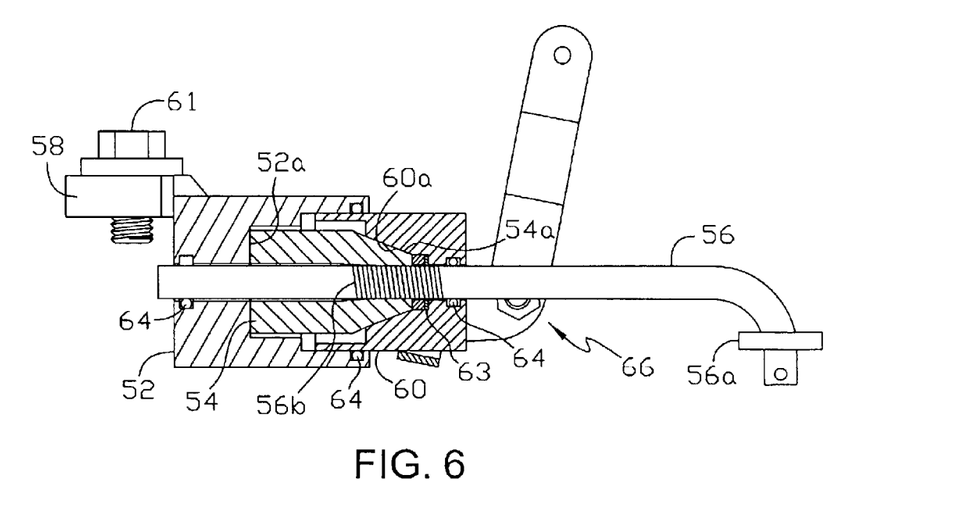
FIG. 6 illustrates a cross-sectional view of the cruise control system of FIG. 2 in the activated position.
Figure 7:
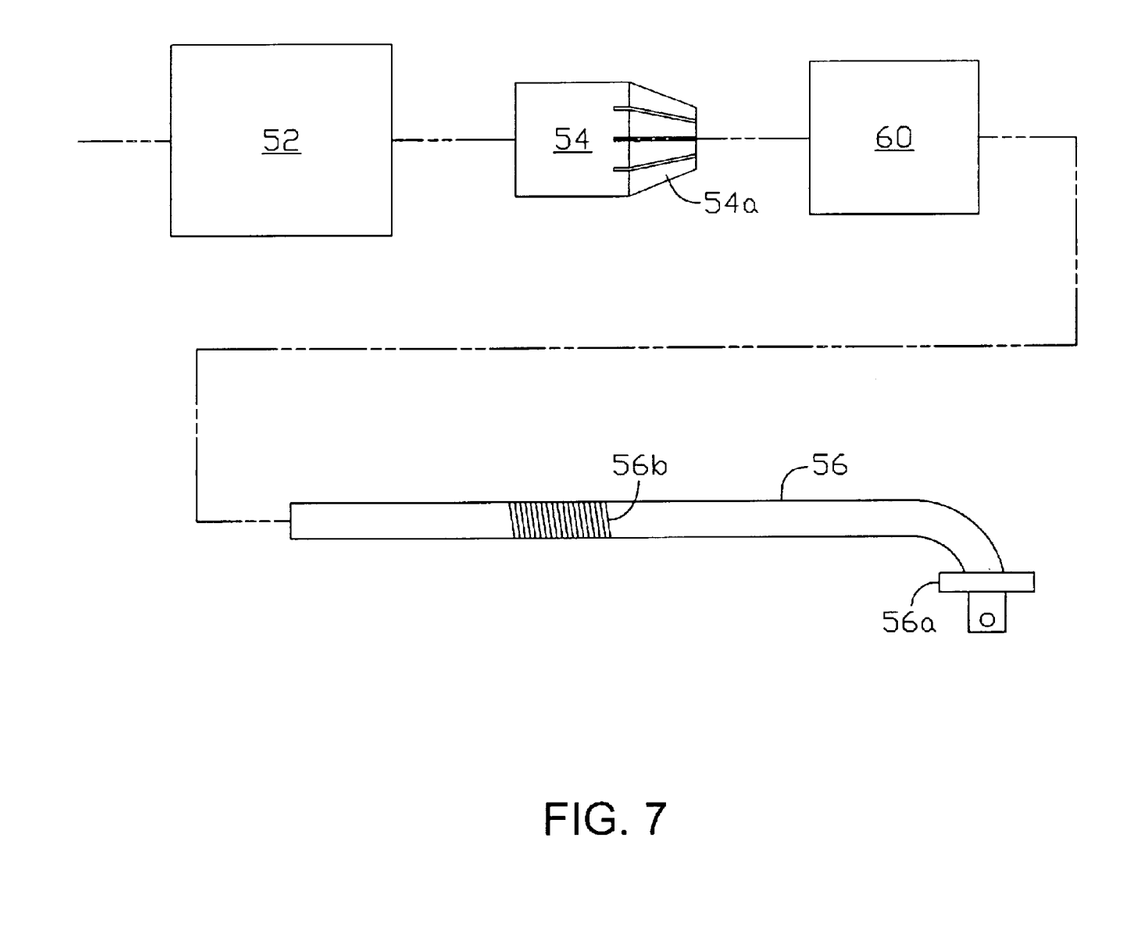
FIG. 7 illustrates an exploded view of a portion of the cruise control system of FIG. 2.

More specifically, as illustrated in FIGS. 5–7, the rod 56 passes through the center of a plurality of generally resilient clamping teeth 54*a* that are arranged around the circumference of an opening that is part of a passage formed through the clamp 54. At one end, the rod 56 may extend from a passage that is also formed in the housing 52. At the other end, the rod 56 is rotatably attached to the control arm 30 to thereby allow the control arm 30 to move freely with respect to the cruise control mechanism 39 when the cruise control mechanism 39 is disengaged. In the illustrated example, the control arm 30 passes through an opening formed in the control arm 30 and a cotter pin may be used to maintain the control arm 30 between the cotter pin and a shoulder 56*a* formed on the rod 56. Since the housing 52 is fixedly mounted to the casing 24, when the control arm 30 is moved, the rod 56 will follow and move within the passages formed in the clamp 54 and housing 52. During such movement, the rod 56 may rotate in the opening formed in the control arm 30 and the housing 52 may rotate about the bolt 61, as necessary. This movement is, however, inhibited when the cruise control mechanism 39 is activated as described below.

For maintaining the clamp 54 in the housing 52 and for forcing the clamping teeth 54*a* onto the rod 56 to effect cruise control, the cruise control mechanism 39 has a sleeve 60 that is moveably carried within the housing 52 over the clamp 54. As illustrated in FIGS. 5 and 6, the sleeve 60 also includes a passage through which the rod 56 passes. To environmentally protect the housing 52 and housing components, an O-ring or other seal 64 may be positioned adjacent to the passage in the sleeve 60, and a passage in the housing 52 if applicable, through which the rod 56 passes. For this same purpose, a seal 64 may also be positioned adjacent to the sleeve 60 in the housing 52. The rod 56 may also be provided with a protective coating, for example a zinc-plating, to provide some resistance to corrosion. Between the sleeve 60 and the clamp 54 is positioned a spring 63, for example a washer spring, the function of which is described hereinafter. To engage and force the clamping teeth 54*a* onto the rod 56 to frictionally engage the rod 56 when the sleeve 60 is reciprocated inwardly to effect cruise control, the passage in the sleeve 60 has an angled interior surface 60*a* that is adapted to cooperatively move the resilient clamping teeth 54*a*.

Figure 4:
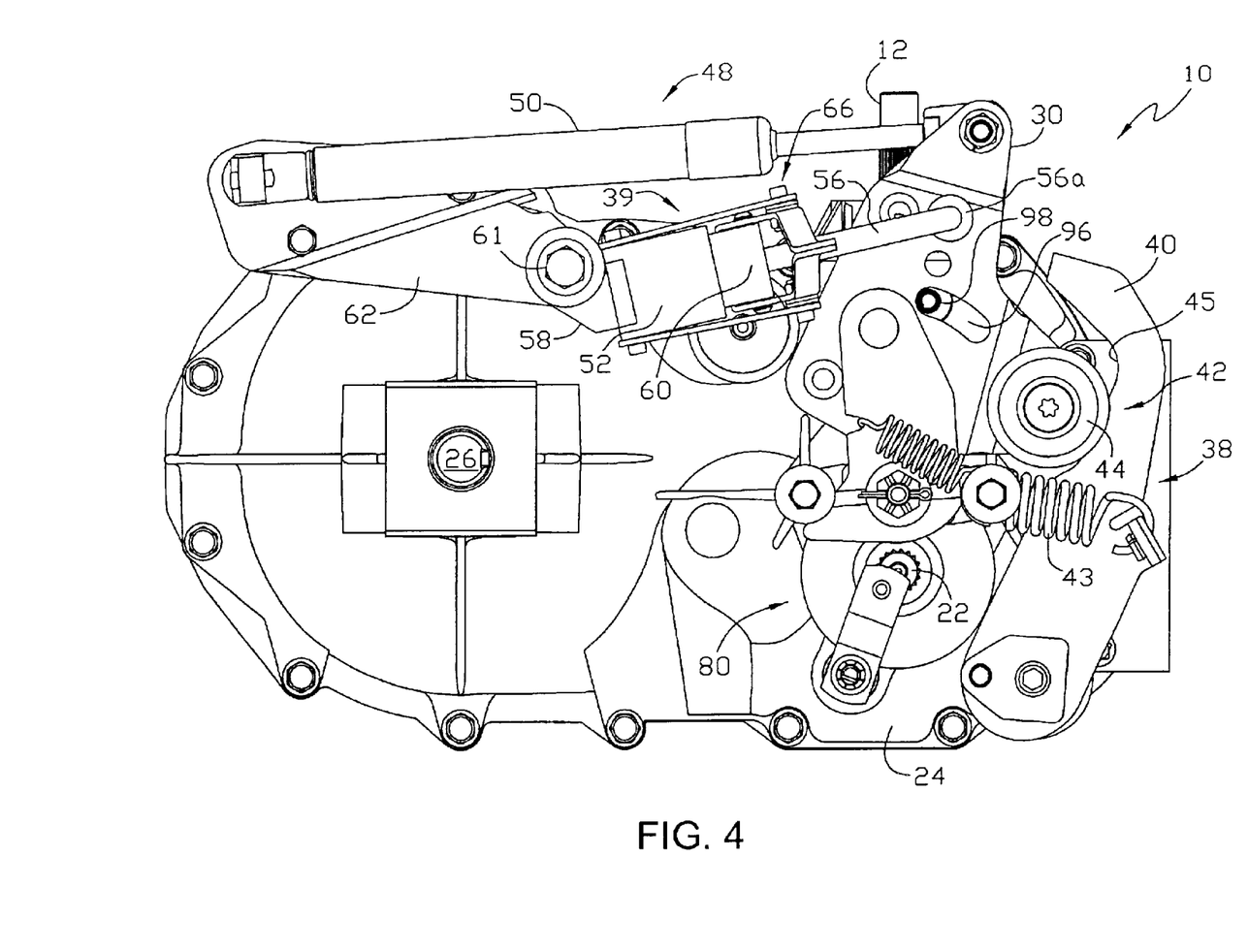
FIG. 4 illustrates the cruise control system of FIG. 2 in an activated position with the hydrostatic transmission in a forward driving position.

For moving the sleeve 60 with respect to the housing 52 so as to selectively cause the sleeve 60 to force the clamping teeth 54*a* onto the rod 56, the sleeve 60 is attached to an over center pivoting mechanism 66. The pivoting mechanism 66 is, in turn, connected via a linkage 68, for example, to a cruise control lever 70 or the like. In this manner, the cruise control lever 70 may be moved so as to cause the pivoting mechanism 66 to move the sleeve 60 inward with respect to the housing 52 to cause the angled surface 60*a* to force the teeth 54*a* onto the rod 56 at a non-discrete position along the rod 56 to thereby inhibit movement of the rod 56 and, accordingly, the control arm 30 under the influence of the RTN mechanism 38, as illustrated in FIG. 4. During such movement of the sleeve 60, it will be appreciated that the clamp 54 is seated against seat 52*a* formed in the housing 52.

The cruise control lever 70 may also be moved to release the pivoting mechanism 66 so as to cause the pivoting mechanism, in conjunction with spring washer 63, to move the sleeve 60 outward with respect to the housing 52 so as to allow the teeth 54*a* to return to a state in which the teeth 54*a* are no longer forced onto the rod 56 by the angled surface 60*a* to provide frictional engagement that is sufficient to hold the rod 56. When the cruise control mechanism is deactivated in this manner, the rod 56 is free to move relative to the housing 52, clamp 54, and sleeve 60 thereby freeing the control arm 30 for movement. Thus, in the deactivated position, illustrated in FIGS. 2 and 3, the cruise control mechanism 39 will not interfere with the functioning of the RTN mechanism 38 described above. In the deactivated position, it is also preferred that the clearance between the clamp teeth 54*a* and the rod 56 be sufficient to minimize wearing of the clamp teeth 54*a*.

It will be further appreciated that the cruise control mechanism 39 illustrated in FIGS. 1–6 may be used to generally maintain a desired hydrostatically driven vehicle speed in either the forward or reverse driving direction. This may be particularly advantageous in that it allows the IHT 10 to be installed in either a reverse or forward orientation. However, (with reference to the orientation illustrated in the figures) if it is desired that the speed be maintainable in only the forward driving direction, the rod 56 can be provided with a polished or low friction surface over an area that would fall under the clamping teeth 54*a* should the control arm 30 be in a reverse driving direction, be provided with a relatively smaller diameter over that area (as compared to an area that would be engageable by the clamp), etc., such that the clamping teeth 54*a* cannot provide sufficient frictional engagement, or any engagement, with the rod 56 when the cruise control mechanism 39 is activated. To then allow for forward driving cruise control, the rod 56 would be provided with a rough surface over an area 56*b* that would fall under the clamping teeth 54*a* should the control arm 30 be in the forward driving direction, be provided with relatively larger diameter over that area, etc., such that the clamping teeth 54*a* provide sufficient engagement with the rod 56 when the cruise control mechanism is activated. By way of example, the rough surface can be created by providing the rod 56 with shallow grooves that cooperate with the clamping teeth 54*a* to improve the frictional engagement therebetween. To minimize wear on the clamping teeth 54*a*, exemplary grooves might be approximately 0.010 inches deep. It will be appreciated that the rod 56 can also be provided with such a friction enhancing surface when the cruise control is desired to be used in both the forward and reverse driving directions to the same end.

To limit the range of motion of the control arm 30, the control arm 30 may be provided with a slot 96 in which is disposed a pin or the like 98. In this manner, one end of the slot 96 will engage the pin 98 when the control arm 30 attains the allowed, full forward driving position (illustrated in FIG. 3). The other end of the slot 96 will engage the pin 98 when the control arm 30 attains the allowed, full reverse driving position.

To slow and/or stop movement of the motor shaft 22 and, accordingly, movement of the axle shaft(s) 24, for example, to prevent free-wheeling of the vehicle 36, a parking brake mechanism 80 may be mounted to the housing 24 so as to engage the motor shaft 22. It will be appreciated that the brake mechanism 80 may be a disc brake mechanism, as illustrated in FIGS. 1–5, a cogged parking brake (not illustrated), or the like. Since such parking brake mechanisms are well known, they will not be discussed in greater detail herein for the sake of brevity.

While specific embodiments of the invention have been described in detail, it will be appreciated by those skilled in the art that various modifications and alternatives to those details could be developed in light of the overall teachings of the disclosure.

Accordingly, the particular arrangements of the return to neutral mechanism, dampening mechanism, brake mechanism, etc. disclosed are meant to be illustrative only and not limiting as to the scope of the invention which is to be given the full breadth of the appended claims and any equivalents thereof.

What is claimed is:

1. An assembly, comprising:
   a hydraulic pump;
   a swash plate;
   a control arm linked to the swash plate and moveable to provide the swash plate with a plurality of non-discrete angular orientations to affect fluid displacement of the hydraulic pump;
   a driving link attached to the control arm and moveable to cause movement of the control arm:
   a rod connected to and driven by the control arm; and
   a clamp for selectively engaging the rod to Inhibit movement of the control arm so as to maintain the wash plate in one of the plurality of non-discrete angular orientations.

2. The assembly as recited in claim 1, wherein the rod Is provided with a friction enhancing surface.

3. The assembly as recited in claim 2, wherein the friction enhancing surface comprises grooves formed In the rod.

4. The assembly as recited in claim 2, wherein the friction enhancing surface is limited to a portion of the rod.

5. The assembly as recited in claim 1, further comprising a housing in which the clamp is carried.

6. The assembly as recited in claim 5, further comprising a reciprocating sleeve carried with the housing that is cooperable with the clamp to cause the clamp to selectively engage the rod.

7. The assembly as recited in claim 6, wherein the clamp comprises a plurality of resilient clamping teeth formed around a damp passage in which the rod is disposed and the sleeve comprises an angled surface for engaging the clamping teeth and selectively forcing the clamping teeth into engagement with the rod.

8. The assembly as recited in claim 7, wherein the sleeve comprises a sleeve passage in which the rod is disposed and wherein a seal is positioned around the rod so as to seal the sleeve passage.

9. The assembly as recited in claim 7, wherein the housing comprises a housing passage in which the rod is disposed and wherein a seal is positioned around the rod so as to seal the housing passage.

10. The assembly as recited in claim 7, further comprising an over-center pivoting mechanism for reciprocating the sleeve with the housing.

11. The assembly as recited in claim 10, further comprising a spring positioned between the sleeve and the clamp for biasing the sleeve away from the clamp.

12. The assembly as recited in claim 10, wherein the housing is rotatably mounted to a casing in which the hydraulic pump is carried.

13. The assembly as recited in claim 12, wherein the rod is rotatably linked to the control arm.

14. The assembly as recited in claim 13, further comprising a return to neutral mechanism associated with the control arm for biasing the control arm to a position in which the awash plate has an angular orientation placing the hydraulic pump in a neutral position.

15. An assembly, comprising:
    a hydraulic pump:
    a hydraulic motor in fluid communication with the hydraulic pump;
    an axle shaft linked to and drivable by the hydraulic motor;
    a swash plate;
    a control arm linked to the swash plate and moveable to provide the swash plate with a plurality of non-discrete angular orientations to affect fluid displacement of the hydraulic pump;
    a driving link attached to the control arm and moveable to cause movement of the control arm;
    a rod connected to and driven by the control arm; and
    a clamp for selectively engaging the rod to inhibit movement of the control arm so as to maintain the swash plate in one of the plurality of non-discrete angular orientations.

16. The assembly as recited in claim 15, wherein the rod is provided with a friction enhancing surface.

17. The assembly as recited in claim 16, wherein the friction enhancing surface comprises grooves formed in the rod.

18. The assembly as recited in claim 16, wherein the friction enhancing surface is provided to the rod over a first portion of the rod that falls within the clamp when the control arm is in a position for causing the swash plate to have an angular orientation for driving the hydraulic motor and axle shaft in a forward direction.

19. The assembly as recited in claim 18, wherein a friction reducing surface is provided to the rod over a second portion of the rod that falls within the clamp when the control arm is in a position for causing the swash plate to have an angular orientation for driving the hydraulic motor and axle shaft in a reverse direction.

20. The assembly as recited in claim 19, wherein the friction reducing surface comprises a smoothed surface.

21. The assembly as recited in claim 19, wherein the friction reducing surface comprises the rod having a diameter in the second portion that is relatively smaller than a diameter of the rod in the first portion.

22. The assembly as recited in claim 16, wherein the friction enhancing surface is provided to a substantial portion of the rod that moves within the housing.

23. The assembly as recited in claim 15, further comprising a housing in which the clamp is carried.

24. The assembly as recited in claim 23, further comprising a reciprocating sleeve carried with the housing that is cooperable with the clamp to cause the clamp to selectively engage the rod.

25. The assembly as recited in claim 24, wherein the clamp comprises a plurality of resilient clamping teeth formed around a clamp passage in which the rod is disposed and the sleeve comprises an angled surface for engaging the clamping teeth and selectively forcing the clamping teeth into engagement with the rod.

26. The assembly as recited in claim 25, wherein the sleeve comprises a sleeve passage in which the rod is disposed and wherein a seal is positioned around the rod so as to seal the sleeve passage.

27. The assembly as recited in claim 25, wherein the housing comprises a housing passage in which the rod is disposed and wherein a seal is positioned around the rod so as to seal the housing passage.

28. The assembly as recited in claim 25, further comprising an over-center pivoting mechanism for reciprocating the sleeve with the housing.

29. The assembly as recited in claim 28, further comprising a spring positioned between the sleeve and the clamp for blasing the sleeve away from the clamp.

30. The assembly as recited in claim 29, wherein the housing is rotatably mounted to a casing in which the hydraulic pump and hydraulic motor is carried.

31. The assembly as recited in claim 25, wherein the rod is rotatably linked to the control arm.

32. The assembly as recited in claim 25, further comprising a return to neutral mechanism associated with the control arm for biasing the control arm to a position in which the swash plate has an angular orientation that places the hydraulic pump in a neutral position.

33. A clamping cruise control assembly for use in connection with a hydraulic pump and a control arm linked to a swash plate to provide the swash plate with a plurality of non-discrete angular orientations to affect fluid displacement of the hydraulic pump, the clamping cruise control assembly comprising:
 a rod linked to and moveable with the control arm;
 a housing;
 a clamp carried within the housing having clamping teeth formed around a clamp passage in which the rod is disposed; and
 a sleeve having an angled surface formed around a sleeve passage in which the rod is disposed wherein the sleeve is adapted to be reciprocated within the housing to selectively move the angled surface into contact with the damping teeth to force the clamping teeth into releasable engagement with the rod.

34. The cruise control system as recited in claim 33, further comprising a mechanism attached to the sleeve for reciprocating the sleeve within the housing.

35. The cruise control system as recited in claim 34, wherein the mechanism comprises an over-center pivoting mechanism.

36. The cruise control system as recited in claim 33, further comprising a spring positioned between the sleeve and the clamp for biasing the sleeve away from the clamp.

37. The cruise control system as recited in claim 33, further comprising a seal positioned around the rod so as to seal the sleeve passage.

38. The cruise control system as recited in 33, wherein the housing has a housing passage for accepting the rod and a seal is positioned around the rod so as to seal the housing passage.

39. The cruise control system as recited in claim 33, wherein the rod is provided with a corrosion resistant coating.

40. The cruise control system as recited in claim 33, wherein the rod is provided with a friction enhancing surface.

41. The cruise control system as recited in claim 40, wherein the friction enhancing surface comprises grooves formed in the rod.

42. The cruise control system as recited in claim 40, wherein the friction enhancing surface extends along a substantial length of the rod that is moveable within the housing.

43. The cruise control system as recited in claim 40, wherein the friction enhancing surface is provided to the rod over a first portion of the rod that falls within the clamp when the control arm is in a position that causes the swash plate to have a first predetermined range of angular orientations.

44. The cruise control system as recited in claim 43, wherein a friction reducing surface is provided to the rod over a second portion of the rod that falls within the clamp when the control arm is in a position that causes the swash plate to have a second predetermined range of angular orientations.

45. The cruise control system as recited in claim 44, wherein the friction reducing surface comprises a smoothed surface.

46. The cruise control system as recited in claim 44, wherein the friction reducing surface comprises the rod having a diameter in the second portion that is relatively smaller than a diameter of the rod in the first portion.

* * * * *

UNITED STATES PATENT AND TRADEMARK OFFICE
CERTIFICATE OF CORRECTION

PATENT NO. : 6,837,142 B1
DATED : January 4, 2005
INVENTOR(S) : Poplawski and Wiley It is certified that error appears in the above-identified patent and that said Letters Patent is hereby corrected as shown below:

Column 7,
Line 12, replace "Inhibit" with -- inhibit --.
Line 13, replace "wash" with -- swash --.
Line 16, replace "Is" with -- is --.
Line 19, replace "In" with -- in --.
Line 30, replace "damp" with -- clamp --.
Line 56, replace "awash" with -- swash --.

Column 8,
Line 60, replace "blasing" with -- biasing --.

Column 9,
Line 18, replace "damping" with -- clamping --.

Signed and Sealed this

Fifth Day of April, 2005

JON W. DUDAS
*Director of the United States Patent and Trademark Office*